E. A. GRESENS & A. FAERBER.
SPEED INDICATOR.
APPLICATION FILED MAY 1, 1914. RENEWED JUNE 22, 1915.
1,172,984.
Patented Feb. 22, 1916.
2 SHEETS—SHEET 1.
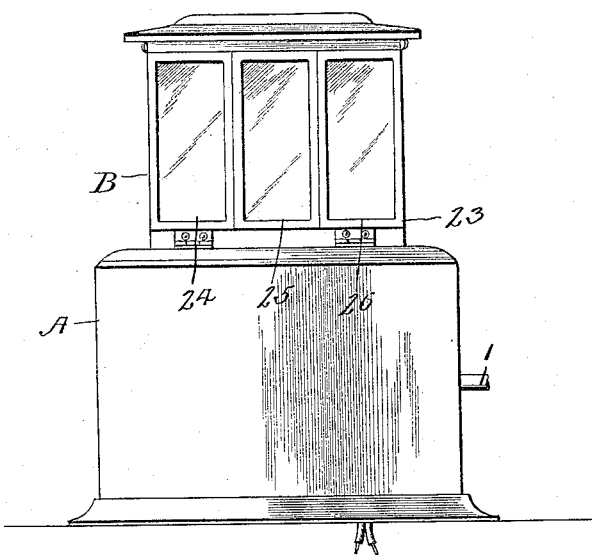
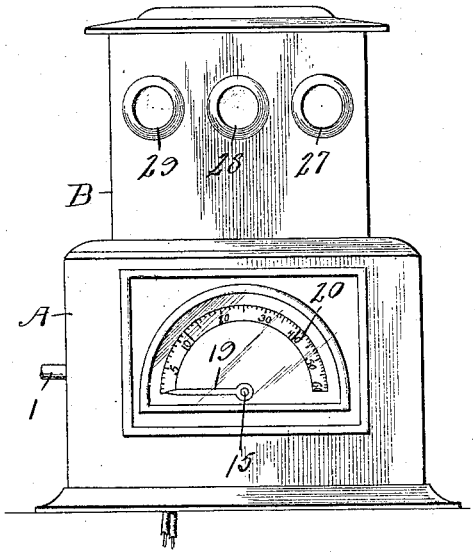
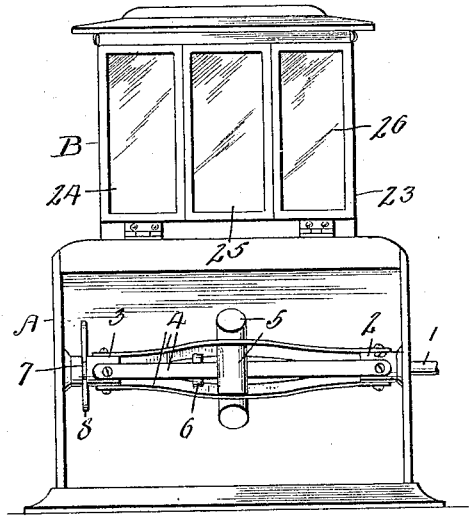
Inventors
E. A. Gresens and
A. Faerber,
By Victor J. Evans
Attorney
Witnesses

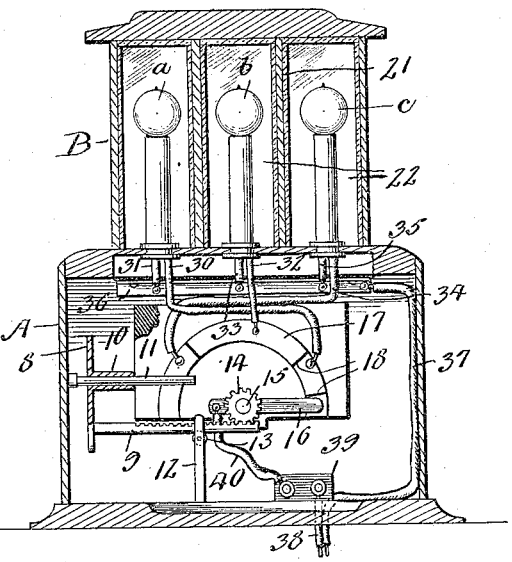
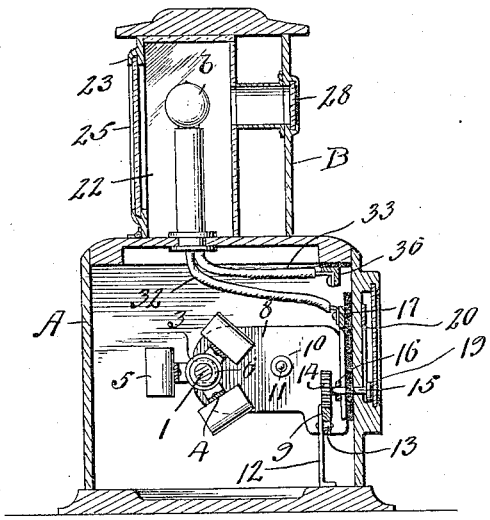
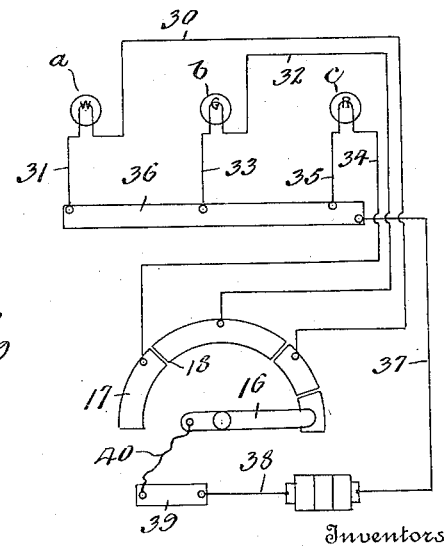

UNITED STATES PATENT OFFICE.

EDWARD A. GRESENS AND ALBERT FAERBER, OF RUSH, NEW YORK.

SPEED-INDICATOR.

1,172,984.

Specification of Letters Patent.

Patented Feb. 22, 1916.

Application filed May 1, 1914, Serial No. 835,681. Renewed June 22, 1915. Serial No. 35,697.

*To all whom it may concern:*

Be it known that we, EDWARD A. GRESENS and ALBERT FAERBER, citizens of the United States, residing at Rush, in the county of Monroe and State of New York, have invented new and useful Improvements in Speed-Indicators, of which the following is a specification.

This invention relates to speed indicators, the object in view being to produce a device of the class referred to in which the speed will not only be indicated by the usual indicating pointer and dial but also by means of a series of different colored lights visible both to the operator of the car and to pedestrians and others who by glancing at the indicator may know whether the motor vehicle is proceeding within the speed limits or exceeding the same, the device being particularly useful after dark. The indicating device simultaneously notifies the operator of the car and policemen and in this way will be instrumental in reducing the number of accidents and fatalities and will not require the services of the large number of motorcycle and bicycle policemen now employed as the ordinary street policeman may ascertain at a glance the speed at which the motorcar is traveling.

With the above and other objects in view, the invention consists in the novel construction, combination and arrangement of parts, as will be hereinafter more fully described, illustrated and claimed.

In the accompanying drawings:—Figure 1 is a front elevation of the speed indicator of this invention. Fig. 2 is a rear elevation of the same. Fig. 3 is a front elevation with the adjacent side of the casing removed showing the governor mechanism. Fig. 4 is a vertical section taken to one side of the governor and showing the switch or contact plate and the operating mechanism. Fig. 5 is a vertical cross section looking in the direction of the shifting fork. Fig. 6 is a diagrammatic view of the wiring.

The speed indicator contemplated in this invention is especially designed for attachment to the forward part of a motor vehicle so that the different colored lights will be clearly visible to persons in front of the machine. The casing comprises a lower section A and a relatively smaller upper section B, the lower section containing the speed indicating mechanism and the upper section of the casing containing the lamps hereinafter referred to.

The mechanism for indicating the speed at which the motor vehicle is traveling comprises essentially a rotary governor shaft 1 actuated by any suitable driving means from one of the axles or wheels of the machine such as sprocket wheels and chain or a flexible shaft or the like. The governor shaft has a fixed collar 2 thereon and a slidable collar 3, the said collars being connected by a series of springs 4 carrying weights 5 adapted to move outwardly or away from the shaft by centrifugal action, the movement of the sliding collar 3 being limited by a stop collar 6 adjustable to any desired point on the governor shaft.

The slidable collar is provided with a groove 7 which is engaged by a shiftable fork 8 having attached thereto and movable therewith a rack bar 9 the purpose of which will appear. The shifting fork is provided with a tubular guiding extension 10 which encircles and slides longitudinally upon a fixed guide rod 11 attached to the inside of the lower section of the casing. This insures the smooth, easy and reliable rectilinear movement of the shifting fork as it is acted upon by the slidable governor sleeve.

The rack bar is slidable through a stationary guide 12 and coöperates with a backing roller 13 journaled in said guide, said roller serving to hold the rack bar accurately in mesh with a pinion 14 fast on a short pinion shaft 15 journaled in the wall of the casing. Fast on the pinion shaft is a contact finger 16 the outer extremity of which moves in contact with and sweeps around an arcuate contact plate 17 which is divided at the points 18 into a number of sections insulated from each other and each in circuit with a different colored lamp as will hereinafter appear.

Fast on the same pinion shaft is an indicating hand or pointer 19 which sweeps over the face of a graduated dial 20 graduated to indicate miles per hour and resembling the ordinary speedometer now in common use. This pointer and dial being at the rear side of the casing, are always visible to the operator of the machine.

The casing section B is divided by vertical partitions 21 into several lamp containing compartments 22 in which are arranged electric lamps *a*, *b* and *c* of different colors such as white, green and red. At the front side of the casing section B is a hinged door 23 for giving access to the lamps and said door is provided with large vertically elongated transparent panels 24, 25 and 26. These panels may be of different colors such as white, green and red in which case the lamps contained in the casing may all be of white. At the front of the casing there are three bull's eye transparent panels 27, 28 and 29 which may also be of different colors such as white, green and red where the lamps themselves are all white or of transparent crystal glass. Either of the coloring expedients may be resorted to as may be preferred.

The white lamp is in electric circuit by means of the outgoing and return wires 30 and 31 with the slow speed section of the contact plate. The green light, for example, is in electrical circuit by means of outgoing and return wires 32 and 33 with the next section of the contact plate and the red lamp is in electrical circuit through the outgoing and return wires 34 and 35 with the next section of the contact plate. Therefore when the machine is proceeding at ordinary speed, the white light will be shown. When the machine approaches or exceeds the speed limit the green light will show and when high speed is obtained the red light will show. The speed at which the lights will change color will of course vary in accordance with the dimensions of the sections of the contact plate and therefore these may be regulated to suit the conditions and traffic laws of the particular city or township in which the speed indicating device is used.

All of the return wires from the lamps are shown as attached to a common connector or manifold 36 the same being connected by a wire 37 to a source of electrical energy such as a magneto. The other wire 38 from the source of electrical energy is connected to a metallic holder 39 within the casing and from said holder a flexible wire 40 extends to and connects electrically with the contact finger which sweeps over the sectional contact plate.

From the foregoing description it will now be understood that the device is entirely automatic in operation. The speed during the day time is plainly indicated by the pointer and dial at the rear of the casing and after dark the speed within certain limits is indicated by the different colored lights visible both to the front and rear of the machine so that they may be simultaneously observed by the operator of the machine and by pedestrians, drivers, policemen and others. The device as a whole will be found very beneficial in reducing reckless driving and accidents and fewer policemen will be required in congested districts to enforce the traffic laws relating to the speed of motor vehicles.

What we claim is:—

In a speed indicator, the combination with a rotary shaft, of a governor actuated sleeve slidable on said shaft, a shifting arm actuated by said sleeve, a tubular guiding extension on said arm, a fixed guide rod on which said extension is slidable, a rack bar projecting from and operated by said arm, a pinion actuated by said rack bar, and indicating means controlled by said pinion.

In testimony whereof we affix our signatures in presence of two witnesses.

EDWARD A. GRESENS.
ALBERT FAERBER.

Witnesses:
HARRY W. LONGFELLOW,
H. GEO. I. DIVER.

Copies of this patent may be obtained for five cents each, by addressing the "Commissioner of Patents, Washington, D. C."